United States Patent [19]
Lawrence

[11] Patent Number: 4,517,436
[45] Date of Patent: May 14, 1985

[54] LASER MARKER FOR ARTICLES OF MANUFACTURE

[75] Inventor: Merlin Lawrence, Fairview, Pa.

[73] Assignee: Automated Industrial Systems, Erie, Pa.

[21] Appl. No.: 419,807

[22] Filed: Sep. 20, 1982

[51] Int. Cl.³ .............................................. B23K 27/00
[52] U.S. Cl. .............................. 219/121 LH; 242/75.5
[58] Field of Search ................. 219/121 LH, 121 LJ, 219/121 EH, 121 EJ; 346/136, 76 L; 242/67.3 R, 75.5, 75.51

[56] References Cited

U.S. PATENT DOCUMENTS

| | | | |
|---|---|---|---|
| 2,259,242 | 10/1941 | Cook | 242/75.51 |
| 2,990,484 | 6/1961 | Jones | 242/75.51 X |
| 3,318,546 | 5/1967 | Bejack | 242/75.51 X |
| 3,424,392 | 1/1969 | Veto et al. | 242/75.51 X |
| 3,535,441 | 10/1970 | Grace | 242/75.51 X |
| 3,672,600 | 6/1972 | Carlson et al. | 242/75.51 X |
| 4,030,131 | 6/1977 | Beiter et al. | 242/75.51 X |
| 4,307,282 | 12/1981 | Gappa | 219/121 LH X |
| 4,370,542 | 1/1983 | Mills et al. | 219/121 LH |

FOREIGN PATENT DOCUMENTS 126676   8/1982   Japan .................................. 346/76 L

*Primary Examiner*—C. L. Albritton
*Attorney, Agent, or Firm*—Charles L. Lovercheck; Wayne L. Lovercheck; Dale R. Lovercheck

[57] ABSTRACT

A machine for marking articles of manufacture such as electronic components is disclosed. The machine has a plate like frame disclosed generally in a vertical plane. The articles to be marked are supported on a backing strip and a cover strip is attached to the backing strip. The strip assembly is wound on a feed roll supported on the machine and as the strip assembly unwinds from the feed roll the backing strip and components are separated from the cover strip by two spaced rolls. The cover strip then passes around another idler roll to the take-up roll. The backing strip and components pass under a dancer roll and then under a laser where they are marked, then under another dancer roll back to the cover strip where the backing strip and cover strip are joined and re-rolled on a take-up roll. The feed reel and take-up reel are both driven by individual motors and a potentiometer is supported on the back of the machine and the dancer rolls are connected to the potentiometer so that as the motors increase tension on the strip the dancer rolls are lifted moving the movable contact of the potentiometer on it and connecting more resistance into the motor circuit whereby the motors are slowed down and thereby even tension is maintained on the strip as the strip assembly is fed off of the feed reel and wound onto the take-up reel thereby increasing the diameter of the strips rolled on the take-up reel. A micrometer adjustment is provided for adjusting the position of the strip and articles under the laser.

15 Claims, 10 Drawing Figures

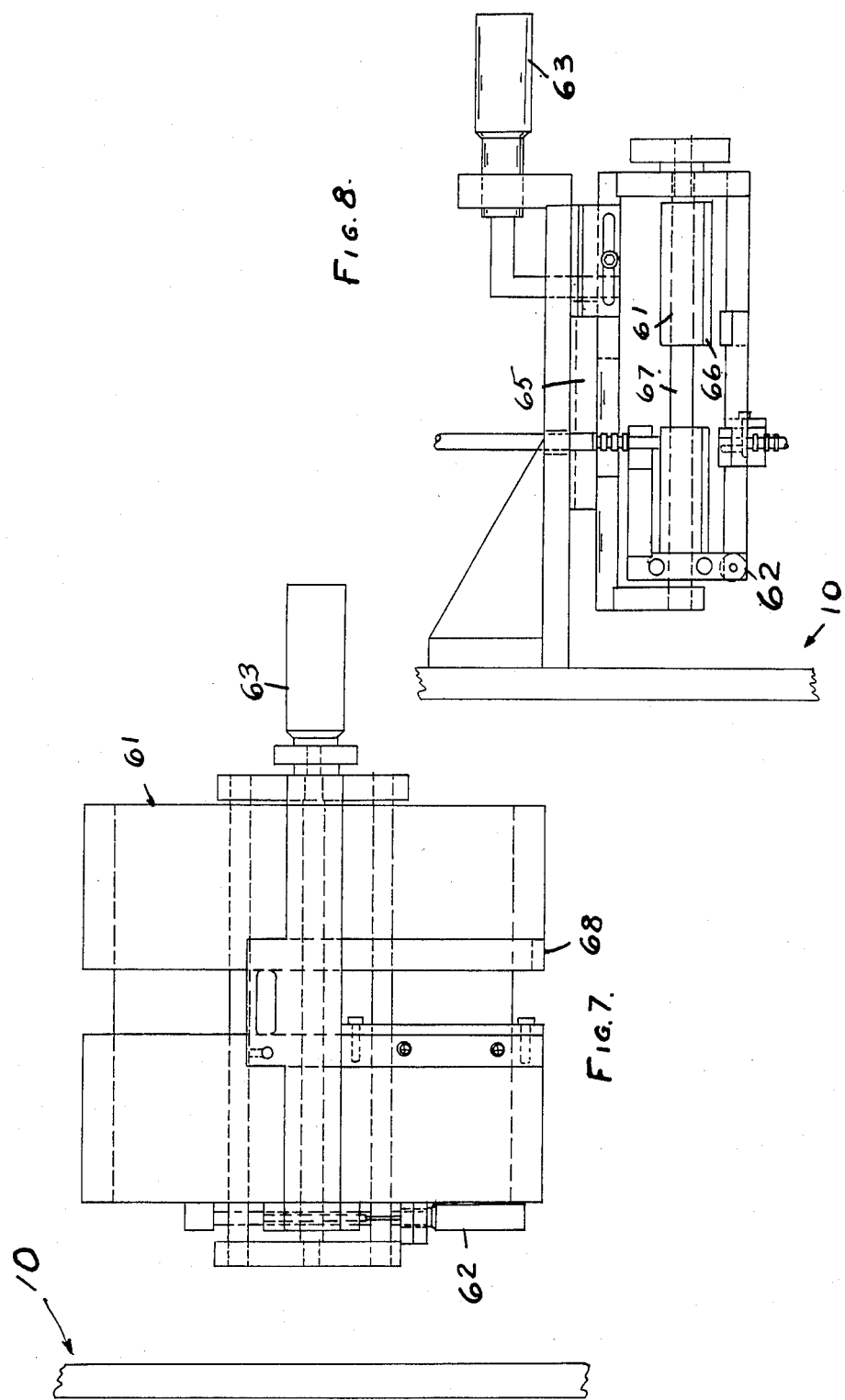

LASER MARKER FOR ARTICLES OF MANUFACTURE

GENERAL DESCRIPTION OF THE INVENTION

This is a dual reel axial lead laser marking machine. The function of this machine is to perform identification marking on axially leaded electronic components utilizing a gas laser. The machine incorporates the use of two feed reels and two take-up reels. The purpose of this arrangement is to allow the operator to be preparing and mounting one set of reels while the other set is being marked, thus reducing the change over time between reels. Each feed and take-up reel is independently driven by a variable speed motor. Linear transducers control and vary the speeds of the motors to control the tension on the component strip. The transducer is mechanically linked to a linear ball slide on which a dancer roller is mounted. As components are unreeled the dancer roller drops which decreases the feed motor speed. As parts are taken up the dancer roller is raised thus signaling an increase in the feed motors speed.

The take up motor is controlled by another mechanism of the same design. When the take up dancer rollers drop, however, the take up motor speed is increased and vise-versa. Thus the two linear transducers in conjunction with the linear dancer roller assembly and bodine gear motors maintain a constant feed and take-up tension on the strip of components being marked.

The guide head is used to guide the components under the laser beam and to trigger it to fire at proper time. Guide plates are adjusted according to the component size by shaft which is threaded right hand on one end and left hand on the other. Guide shoes insure that components are retained in the channel formed by guide plates.

Through beam electric eyes are used to detect the components as they pass through the marking area and trigger the laser. They are adjusted parallel to the line of feed with the micrometer. Adjustment of this micrometer will move the mark to a direction perpendicular to the axis of the components. The entire guide assembly is mounted on linear ball slides which allow the adjustment in the direction parallel to the component axis by means of a micrometer. A jet of air is directed at the component being marked to remove any smoke caused by the process.

REFERENCE TO PRIOR APPLICATIONS

There are no prior Applications related to this Application.

REFERENCE TO PRIOR ART

Applicant is aware of no prior art pertinent to this disclosure.

OBJECTS OF THE INVENTION

It is an object of the invention to provide an improved marker for electronic equipment.

Another object of the invention is to provide a laser marker utilizing a reel carrying the strip and a second reel for winding the strip and a laser marker for marking components and a speed control for controlling the motor driving the reels.

Another object of the invention is to provide a dual drive strip marker.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 6 is an enlarged view of a strip of articles.

FIG. 7 is a top view of the guide head with micrometers for adjustments.

FIG. 8 is a side view of the guide head with micrometers for adjustments.

DETAILED DESCRIPTION OF THE DRAWINGS

Figure 1:
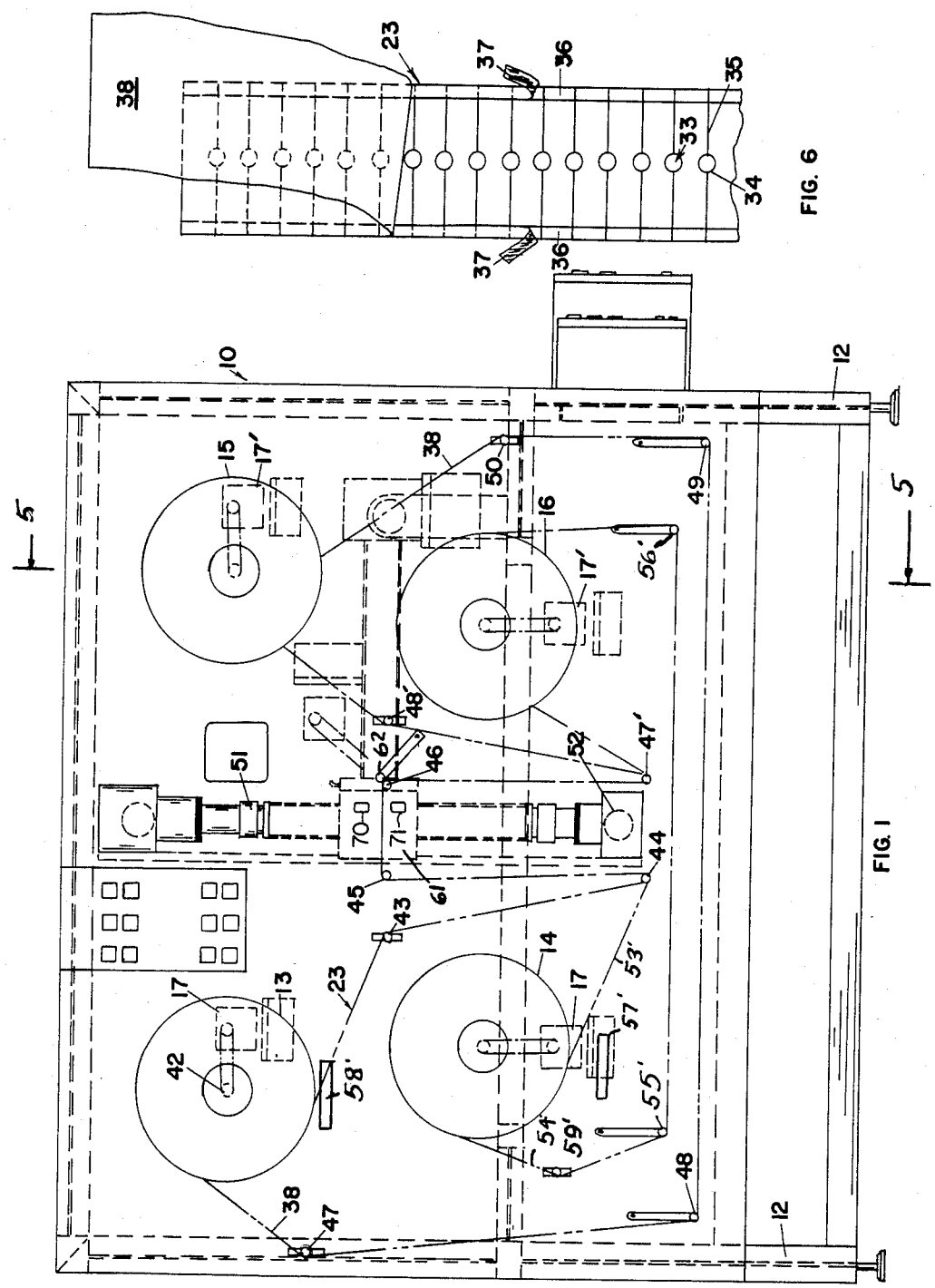
FIG. 1 is a front view of a laser marking machine according to invention.
Figure 2:
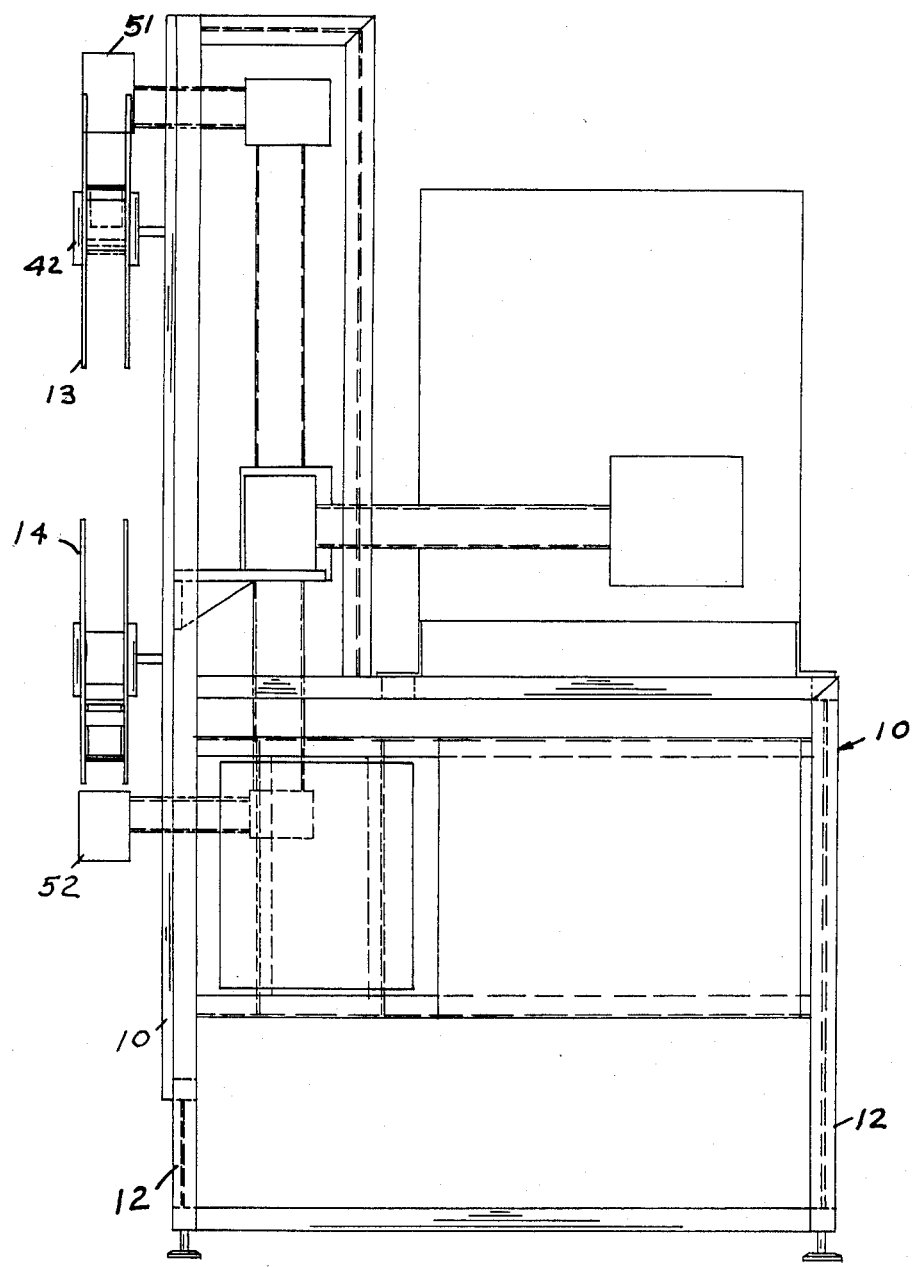
FIG. 2 is a side view of the machine shown in FIG. 1.
Figure 3:
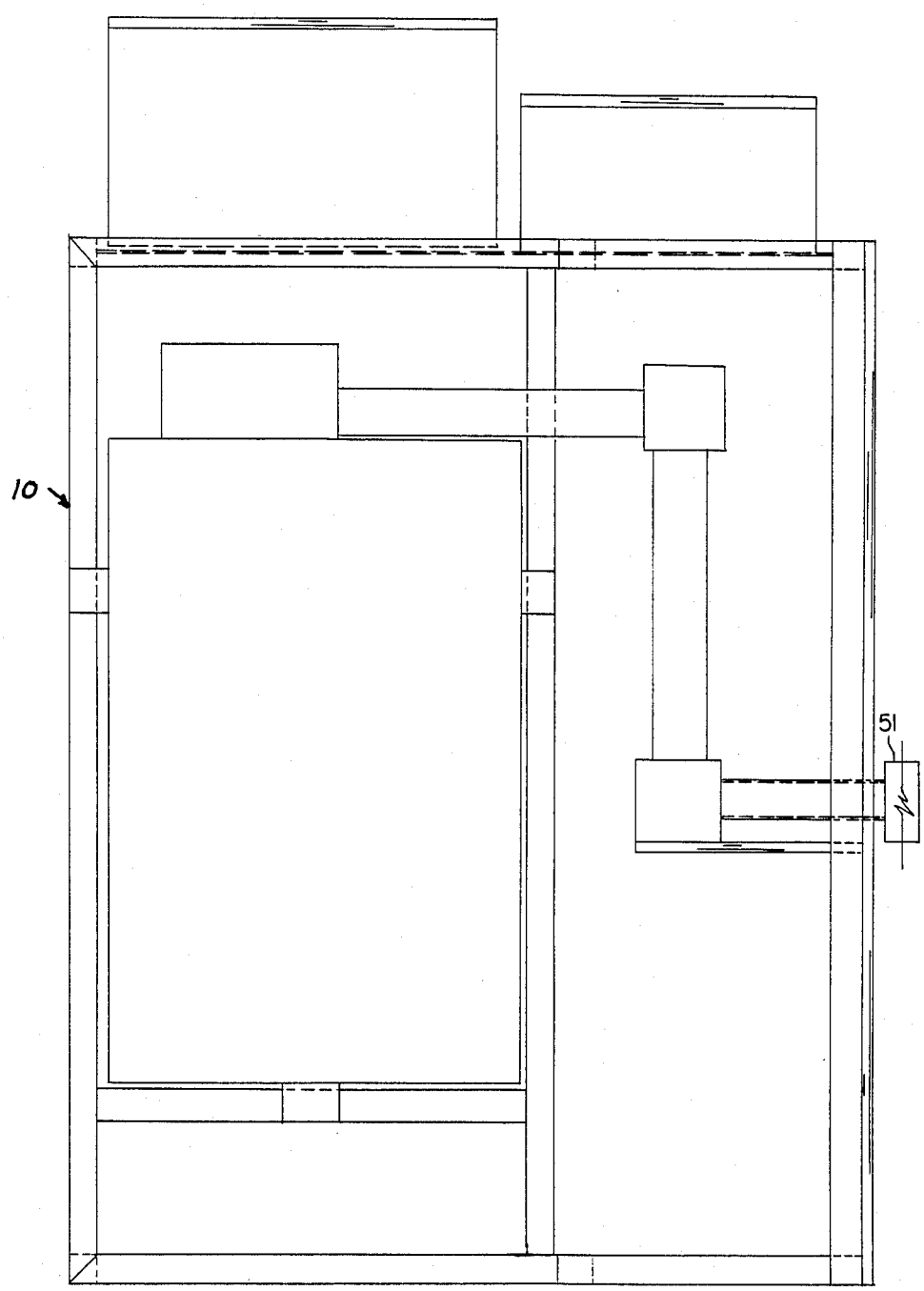
FIG. 3 is a top view of the marker.
Figure 4:
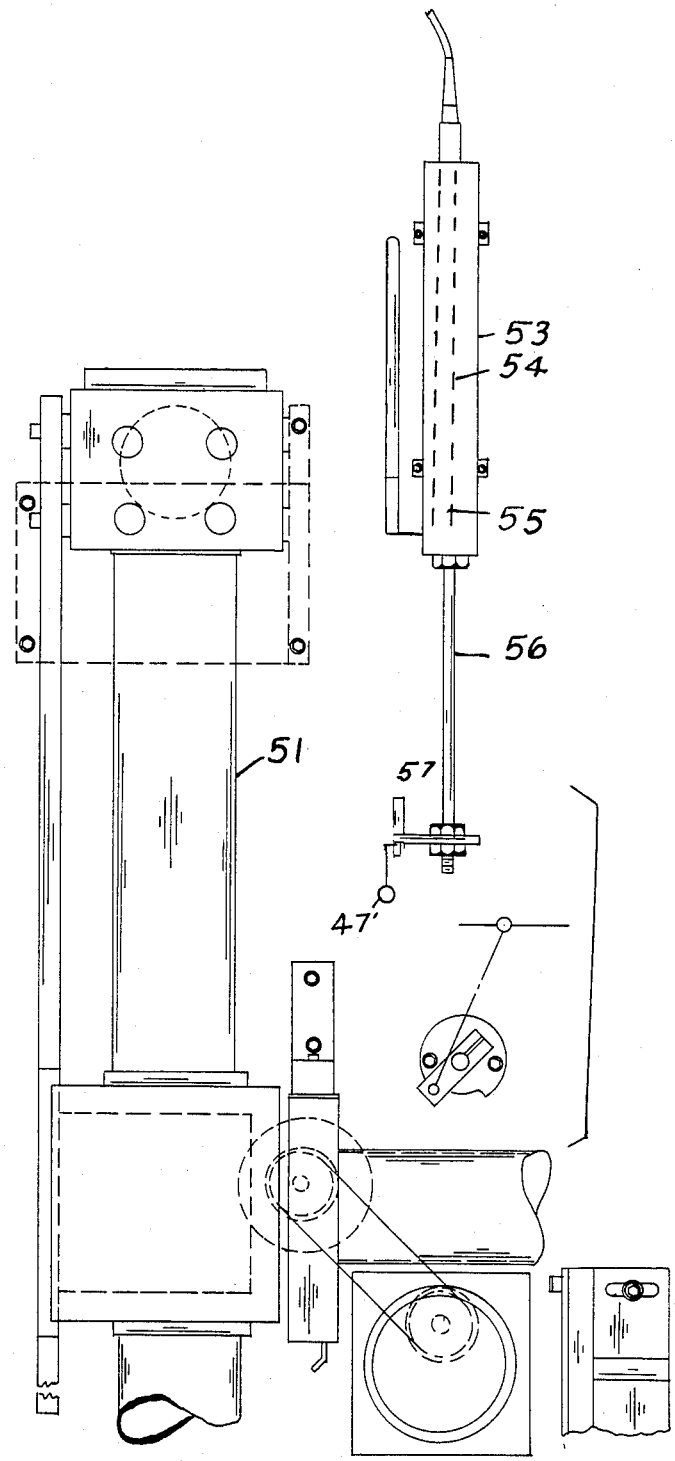
FIG. 4 is a view of the potentiometer used with the machine.
Figure 5:
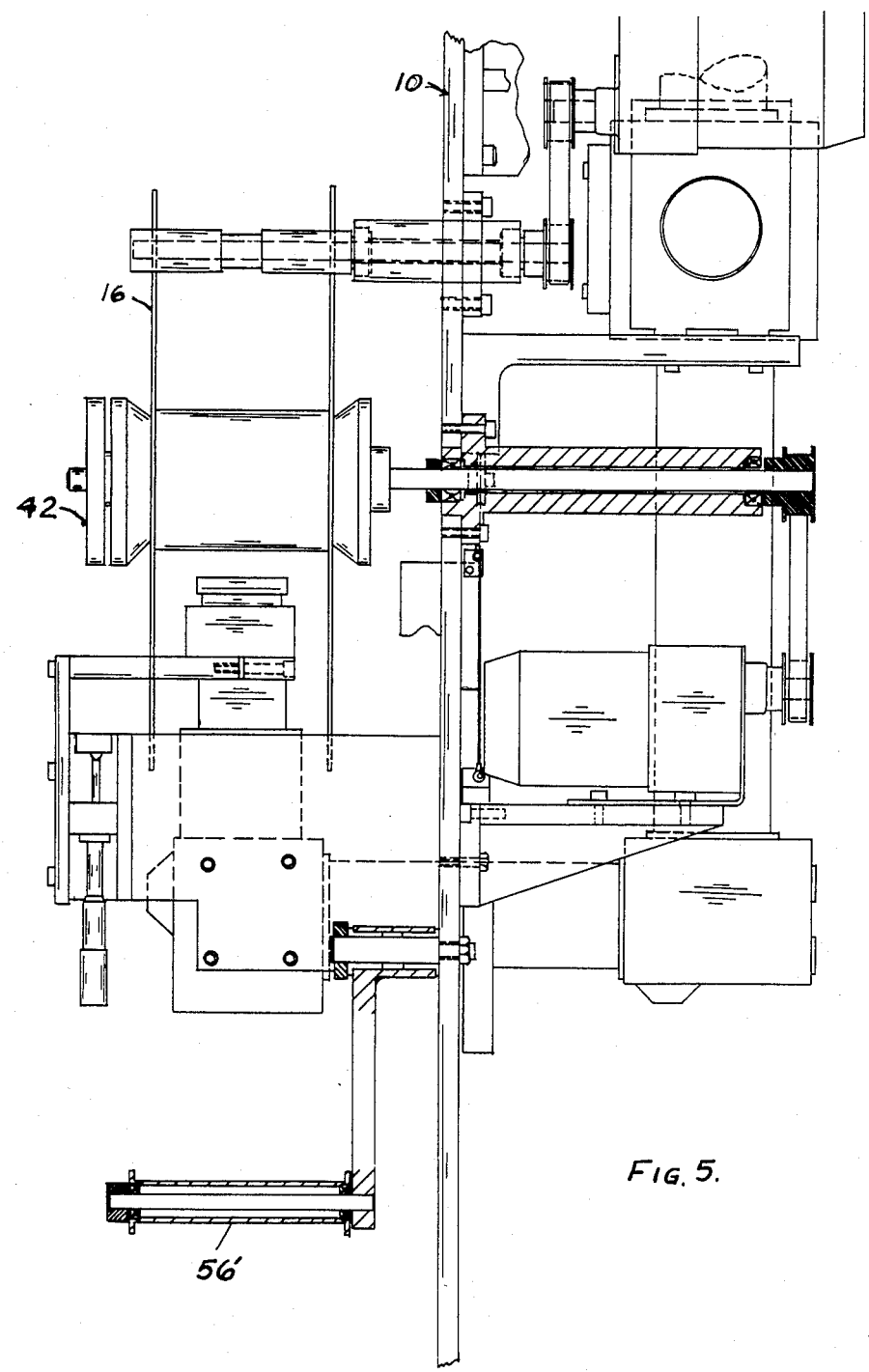
FIG. 5 is a cross sectional view of the marker taken on line 5—5 of FIG. 1.
Figure 10:
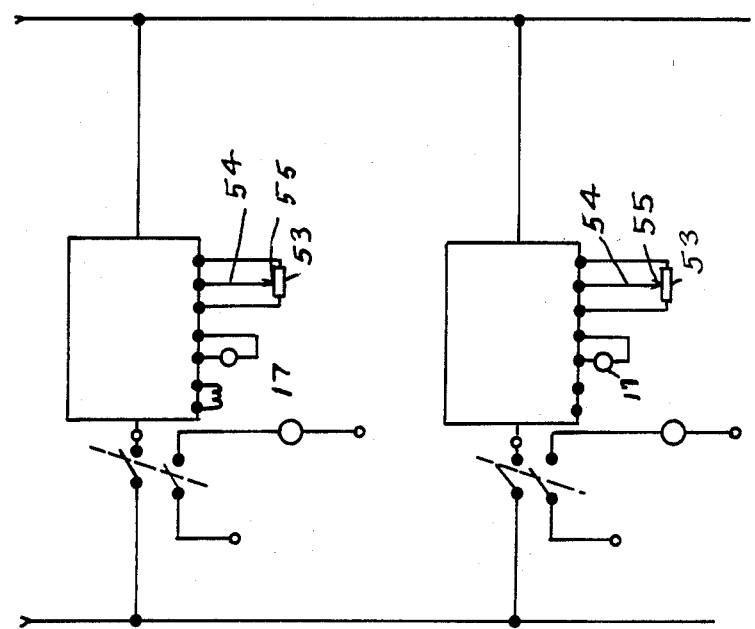
FIG. 10 is a wiring diagram.
Figure 9:
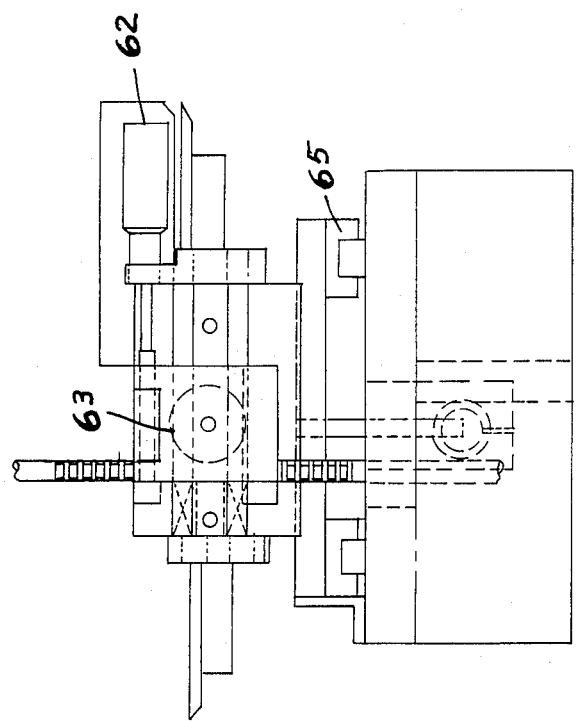
FIG. 9 is a back view of the guide head with micrometers for adjustments.

Now with more particular reference to the drawing the laser marker is shown here generally at 10 for marking electronic components. Each component is made up of a head with wires extending from opposite sides of it. The wires are each supported on a first strip of material. Each first strip is attached to a second strip.

The machine has a plate-like frame with four legs 12 supporting the plate-like frame in vertical position. A first feed roll 13 a second feed roll 14 and a first take-up roll 15 and a second take-up roll 16 are rotatably supported on the plate-like frame and each is driven by an individual gear motor 17 which are supported on the back of the frame and drive the feed reels 13 and 14 and take-up reels 15 and 16 through belts shown.

The assemblys on each feed reel support the electronic components 33 which have beads 34 with an outwardly extending wires 35 on each end thereof. The wires 35 are sandwiched between the edge strips 37 which are held together by a suitable cement. The cover strip 38 overlies the component strips 36 and 37 with the ends of the wires 35 sandwiched therebetween and is held thereto. Therefore, when a reel 13 is supported on a spindle 42 the cover strip 38 is separated from the component strips 37 with the electronic components 33 supported thereon and the component strip 23 is put around a first top guide roll 43 under a dancer roll 44 over a second top guide roll 45 through the laser beam from laser 51, 52 and over the third top guide roll 46 and under a second dancer roll 47' over fourth top guide roll 48' and is wrapped on a take-up reel 15 overtop of the strip 38. The cover strip 38 from feed reel 13 passes from the feed reel 13 which is in operating position over guide roll 47 under guide roll 48 under guide roll 49 over guide 50 to wrap on take-up reel 15 and under the strip 23 where strip 38 and strip 23 are again combined.

A linear transducer 53 is supported on the back of the frame 10. The linear transducer 53 has a resistance element 55 supported in it on which a movable contact 54 slides. The contact 54 is attached to the rod 55 which is in turn supported on the shaft which supports the dancer roll 44. As the strip builds up on the take-up roll 15 the motor 17' driving this roll will increase its torque and tension on the component strip. This increased tension on the component strip will lift the dancer rolls 44 and 47' and move the rod 56 upward which will slide the slider 54 along the resistance element 55 thereby introducing more resistance into the motor circuit of the motor 17' and cause the motor 17' driving roll 15 to slow down thereby reducing the tension on the component strip.

The feed roll 14 is supported on its hub and the take-up roll 16 is supported on its hub for standby loading while the components are being marked on the strip 23. The operator will separate the cover strip 54' from the component strip 53' and put the cover strip 54' around the idler rolls 59 and 55' and idler roll 56' and start the cover strip on the roll 16. Meanwhile, the component strip 53' will be accumulating in the receptacle 57'.

Guide rolls 48, 49, 55, 56' and 62' are swingably supported on the levers shown which are freely swingably supported on the machine. Gravity urges the levers to swing to this position shown to place a tension on the strips 38 and 54' by rolls 48, 49, 55' and 56'. While lever supporting roll 62' exerts a force on the strip between roll 46 and roll 62' thereby increasing the frictional force exerted by the motor driving roll 46.

When the components on the strip 23 are all marked and the strip 23 is all reeled onto take-up reel 15 the operator will thread the component strip 53' under dancer roll 44 over a second top guide roll 45 through the laser beam 51, 52 over the third top guide roll 46 and under the second dancer roll 47' and wrap it on the take-up reel 16. The cover strip 54' from feed reel 14 passes from feed reel 14 which is in operating position over guide roll 59' and under guide rolls 55' and 56' to wrap on take-up reel 16 and under strip 53' where strips 53' and 54' are again combined. While feed reel 14 is being marked and taken up on reel 16, the operator replaces feed reel 13 with a new feed reel 13 and mounts a new take-up reel 15 to replace the old take-up reel 15. Then the operator will separate the cover strip 38 from the component strip 23 and put cover strip 38 around idler roll 47, under idler rolls 48 and 49, around idler roll 50 and place it around take-up reel 15. Meanwhile, the component strip 23 will be accumulating in the receptacle 58'. When the components on 53' are all marked and the strip 53' is all reeled onto take-up reel 16, the operator will again run reels 13 and 15 and replace reels 14 and 16.

A strip is driven by another motor supported on the machine and connected to drive roll 46. Dancer rolls 44 and 47' move up and down with rod 56 of the linear transducer and control the speed of drive motors 17 and 17'.

As the beads 34 pass through the beam of laser 51 and as the photocell 70 senses their position, the laser will be fired marking the particular bead.

SUMMARY OF OPERATION

This is a dual reel axial lead laser marking machine. The function of this machine is to perform identification marking on axially leaded electronic components 33 utilizing a gas laser 51. The machine incorpoates the use of two feed reels 13 and 14 and two take-up reels 15 and 16. The purpose of this arrangement is to allow the operator to be preparing and mounting one set of reels 14 and 16 while the other set 13 and 15 is being marked. Thus, reducing the change over time between reels. Each feed and take-up reel is independently driven by a variable speed motor 17 and 17' respectively. Linear transducers 53 control and vary the speeds of the motors 17 by increasing or decreasing the resistance in series with the motor to control the tension on the component strip 23. The transducer 53 is mechanically linked by bracket 57' to a linear ball slide 44, 47' on which dancer rollers 44 and 47 are mounted. As components are unreeled the dancer roller drops which introduces more resistance into the motor circuits of the takeup motor and decreases the resistance in the feed reels motor and thereby decreases the feed motor 17 speed. As parts are taken up the dancer roller is raised thus signaling an increase in the feed motor's speed.

The take up motor 17' is controlled by another mechanism 47' of the same design. When the take up dancer rollers drop, however, the take up motor 17' speed is increased and vise-versa. Thus the two linear transducers 53 or potentiometer having its movable contact 55 attached to and movable up and down with dancer rollers 44 and 47' assembly and bodine gear motors 17 and 17' maintain a constant feed and take-up tension on the strip of components 23 being marked.

The guide head 61 is used to guide the components 34 under the laser beam. The head has an electric eye sensor 70 which is supported below the track. A light source 71 is supported above the track and a light beam from the light source is interrupted by each part as it passes to trigger the laser to fire at proper time. Guide plates 66 are adjusted according to the component size by shaft 67 which is threaded right hand on one end and left hand on the other. Guide shoes 68 insure that components 34 are retained in the channel formed by guide plates 66.

Through beam electric eyes are used to detect the components as they pass through the marking area and trigger the laser 51. They are adjusted parallel to the line of feed with the micrometer 62. Adjustment of this micrometer 62 will move the mark to a direction perpendicular to the axis of the components. The entire guide assembly is mounted on linear ball 65 slides which allow the adjustment in the direction parallel to the component axis by means of micrometer 63. A jet of air is directed at the component being marked to remove any smoke caused by the process.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for marking indicia on articles of manufacture comprising:
    a frame,
    first support means on said frame for supporting a feed reel having a strip assembly of sheet material supporting said articles thereon,
    second support means on said frame for supporting a take-up reel for rewinding said strip assembly thereon from said feed reel,
    said strip assembly comprising said articles, a support strip, and means holding said articles to said articles to said support strip, a cover strip and a means removably holding said cover strip to said articles, said strip assembly being adapted to be wound on said take up reel, and unwound from said feed reel, said cover strip separated from said articles, said support strip passed under a marking means and said cover strip replaced on said support strip with said articles therebetween and said assembly reeled onto said take-up reel, an individual motor connected to each said feed reel and to each said take-up reel, and means to control said motor for driving said motors at variable speeds, means to support said strip between said reels, said means to control said motors comprising linear transducer means on said frame and connected to said strip support means, and adapted to control the speed of each of said motors in response to the tension on said strip, marking means on said frame between said reels for marking each said article.

2. The machine recited in claim 1 wherein said marker means is a laser.

3. The machine recited in claim 2 wherein sensing means is provided on said machine for sensing the position of each said article to trigger said laser means when an article is in position adjacent to the laser.

4. The machine recited in claim 3 wherein micrometer means is provided on said machine for positioning said strip assembly adjacent to said laser.

5. The machine recited in claim 4 wherein said linear transducer is supported on a linear ball slide.

6. The machine recited in claim 5 wherein idler rolls are supported on said machine and engaging said strip assembly for sliding up and down by force exerted thereon by said strip assembly.

7. The machine recited in claim 6 wherein said idler rolls are attached to said linear transducer comprise a potentiometer having a fixed member attached to said frame and a movable member attached to said idler roll support, p1 said potentiometer being connected to said motor to control the speed thereof as said strip builds up on said takeup rolls or diminishes on said feed rolls.

8. The machine recited in claim 7 wherein said reels are supported to rotate about a horizontal axis.

9. The machine recited in claim 8 wherein second idler rolls are provided, said second rolls being supported on the distal end of arms swingably supported on said machine, said arms being urged by the weight of said idler rolls to exert tension on said strip assembly, thereby providing a generally uniform tension thereon.

10. The machine recited in claim 9 wherein each of said idler rolls comprises an axle supported on each said arm, said rolls being rotatably supported on said axles by low friction bearings.

11. A machine for marking indicia on articles of manufacture comprising:

a frame, first support means on said frame for supporting a feed reel having a strip assembly of sheet material supporting said articles thereon, second support means on said frame for supporting a take-up reel for rewinding said strip assembly thereon from said feed reel, said strip assembly comprising said articles, a support strip, and means holding said articles to said support strip, a cover strip and a means removably holding said cover strip to said articles, said strip assembly being adapted to be wound on said take up reel, and unwound from said feed reel, said cover strip separated from said articles, motor means on said machine for controlling the tension on said cover strip between said feed reel and said take-up reel, said tension control means comprising spaced dancer rolls and means supporting said dancer rolls on said machine, said supporting means comprising an arm swingably supported on said machine, guide rolls rotatably supported on the distal end of said arm, said guide rolls resting on said cover strip on the part thereof suspended between said feed reel and said take-up reel, said motor means comprising individual motors connected to each said feed reel and to each said take-up reel, said individual motors each being adapted to exert a tension on said cover strip, said tension being balanced by said pulleys as said arms swing on said frame by said tension whereby the weight of said pulleys and arms balance the tension exerted by said motor thereby maintaining a constant tension on said cover strip.

12. The machine recited in claim 11 wherein said machine has a second idler pulley supported on a second arm on said frame at a position horizontally spaced from said first arm, said first arm being adapted to swing and said pulley is mounted on the distal ends of said arms being adapted to maintain a tension on said cover strip.

13. The machine recited in claim 12 wherein an impedance means comprises a potentiometer supported on said frame, and a movable contact on said potentiometer attached to a dancer roll on said machine, said dancer roll being adapted to move up or down in a slot on said frame, said dancer roll being supported in a loop of said support strip whereby said take-up roll exerts an excessive tension on said support strip, said dancer roll is lifted, lifting said potentiometer to exert a greater amount of resistance into said motor circuit driving said take-up reel whereby said take-up reel is slowed.

14. The machine recited in claim 13 wherein a drive roll is driven by a motor, said drive roll being adapted to control the speed of articles being marked.

15. The machine recited in claim 11 wherein a receptacle collects said support strip with said articles attached while said cover strip is threaded through said tension controlling means.

* * * * *